Patented Oct. 16, 1928.

1,687,919

UNITED STATES PATENT OFFICE.

MAX YABLICK, OF NEWARK, NEW JERSEY.

PROCESS OF MAKING SILICA GEL.

No Drawing.  Application filed March 10, 1922. Serial No. 542,744.

This invention relates to a process of making silica gel, and has among its objects the production of a material having high efficiency and capacity by a method which is easy, convenient and cheap.

Silica gel finds extensive use as an adsorbent for gases, vapors, mixtures of gases and vapors, and gaseous substances. It is also employed in many chemical reactions as a catalyst.

In preparing this gel a solution of a soluble silicate, preferably sodium silicate or ordinary water glass, is treated with ammonium carbonate, producing a colloidal solution of silicic acid and the probable reaction being:

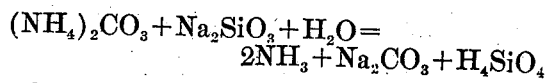

$$(NH_4)_2CO_3 + Na_2SiO_3 + H_2O = 2NH_3 + Na_2CO_3 + H_4SiO_4$$

The silicic acid colloid is allowed to set to a stiff jelly, the probable transformation being:

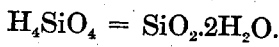

$$H_4SiO_4 = SiO_2 \cdot 2H_2O.$$

This silicious gel is broken up, washed thoroughly to remove the salts adhering thereto and then dried. The resulting material is a hard, glassy, porous mass and translucent to transparent depending on the amount of water held in the pores and the freedom from contaminating salts and other foreign matter.

The silica gel, when properly prepared, has a very porous structure, is hard and stable, and adsorbs gases, vapors and gaseous substances readily. Due to its selective adsorbing action it may be used for removing one or more constituents from gaseous mixtures.

The specific proportions of materials used in my process is not important, it being desirable, however, to work with as strong solutions as possible consistent with the complete reaction taking place between the reacting materials. Satisfactory results may be obtained by using one part of commercial sodium silicate (having a specific gravity of about 1.4) diluted with about four parts of water and to which is added one part of a 10 per cent solution of ammonium carbonate, with constant stirring.

Although I prefer to use ammonium carbonate for reaction with the soluble silicate, I do not desire to be limited thereto, because other substances which will react with the soluble silicate, free the silicic acid therefrom and yield an alkaline liquor, for example ammonium salts such as ammonium bicarbonate, ammonium chloride, acetate, tartrate, nitrate, etc., may be substituted without departing from the spirit and scope of this invention.

The precipitation of the silicious material may be conducted at moderate temperature, if desired, but if higher temperatures are employed, there will be more rapid setting of the gel.

In drying the gel, I prefer to start at a low temperature and raise the temperature slowly and gradually so that nearly all of the water will be driven off and the structure of the gel become stabilized before the gel is subjected to the high temperatures.

I may employ the two-stage drying method and may also use a vacuum to assist in the drying, but I have found that no special advantages are to be derived either from the two-stage drying or from the use of vacuum over my preferred process of raising the temperature continuously and gradually during the drying. This slow, gradual drying avoids the formation of strains and stresses in the gel lumps into which it is broken up before drying, so that on subsequent ignition, the lumps will not fly apart and crumble to a powder.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of preparing silica gel, setting free silicic acid and forming a colloidal solution thereof by adding to a solution of a soluble silicate a sufficient quantity of an ammonium salt which will react therewith, free the silicic acid therefrom and yield an alkaline liquor, allowing the silicic acid to gel in the presence of the alkaline liquor resulting in the reaction, washing and then drying the gel.

2. In a process of preparing silica gel, setting free all the silicic acid from a soluble silicate by adding to a solution thereof a sufficient quantity of a simple ammonium salt which will react therewith, free the silicic acid therefrom and yield an alkaline liquor, allowing the silicic acid to gel in the presence of the alkaline liquor resulting in the reaction, washing and then drying the gel.

3. In a process of preparing silica gel, setting free all the silicic acid from a soluble silicate by adding to a solution thereof a sufficient quantity of $(NH_4)_2CO_3$, allowing the silicic acid to gel in the presence of the alkaline liquor resulting in the reaction, washing and then drying the gel.

4. In a process of preparing silica gel, setting free all the silicic acid from a soluble silicate by adding to a solution thereof a sufficient quantity of $(NH_4)_2CO_3$, thoroughly stirring the substances at the mixing, allowing the silicic acid to gel in the presence of the alkaline liquor resulting in the reaction, washing and then drying the gel.

5. In a process of preparing silica gel, setting free silicic acid and forming a colloidal solution thereof by adding to a solution of a soluble silicate a sufficient quantity of a carbonate of ammonia, allowing the silicic acid to gel in the presence of the alkaline liquor resulting in the reaction, washing and then drying the gel.

MAX YABLICK.